United States Patent [19]

Dreier

[11] Patent Number: 5,699,877

[45] Date of Patent: Dec. 23, 1997

[54] OIL-SLINGER DEVICE PROVIDED WITH A PROJECTION ENGAGING A MATING RECEIVER FORMED IN A TRANSMISSION HOUSING

[75] Inventor: Loren Christopher Dreier, Milford, Mich.

[73] Assignee: ZF Friedrichshafen AG, Friedrichshafen, Germany

[21] Appl. No.: 728,745

[22] Filed: Oct. 10, 1996

[30] Foreign Application Priority Data

Oct. 13, 1995 [DE] Germany .......... 195 38 192.0

[51] Int. Cl.⁶ .................................................. F01M 1/00
[52] U.S. Cl. .................. 184/11.2; 184/11.1; 184/13.1; 74/467
[58] Field of Search ........................... 184/6.12, 11.1, 184/11.2, 13.1; 74/467

[56] References Cited

U.S. PATENT DOCUMENTS

| 1,686,271 | 10/1928 | George et al. ........... 184/11.1 |
| 1,710,121 | 4/1929 | Smith .................... 184/13.1 |
| 2,654,441 | 10/1953 | Orr et al. ............... 184/11.1 |
| 3,515,246 | 6/1970 | Haight et al. ............ 74/467 |
| 4,231,266 | 11/1980 | Nishikawa et al. ........ 74/467 |
| 5,411,116 | 5/1995 | Kish et al. .............. 184/6.12 |
| 5,480,003 | 1/1996 | Hill et al. .............. 184/6.12 |

FOREIGN PATENT DOCUMENTS

| 0 644 359-A1 | 3/1995 | European Pat. Off. . |
| 30 12 80-A1 | 10/1981 | Germany . |

Primary Examiner—Thomas E. Denion
Attorney, Agent, or Firm—Davis and Bujold

[57] ABSTRACT

An oil-slinger device (60) is proposed for a bearing (36) of a shaft (32) in a transmission housing (34) of a motor vehicle (2). On the oil-slinger device (60) projections (72) are provided which cooperate with intakes (74) in the transmission housing (34) to form a positive locking connection. An end (84) of the oil-slinger device (60) is situated within the transmission housing (34) between the bearing (36) to be supplied and the transmission housing (34). The oil-slinger device (60) is preferably made of a heat-resistant plastic material and is divided in three sections, a first section (62) which essentially serves to collect the oil, a second section (70) designed as tank and a third section (8) which conveys the oil to the bearing (36) to be lubricated. Above the oil-slinger device (60) there can be provided ribs (94) from which oil can drip into the oil-slinger device (60).

11 Claims, 4 Drawing Sheets

OIL-SLINGER DEVICE PROVIDED WITH A PROJECTION ENGAGING A MATING RECEIVER FORMED IN A TRANSMISSION HOUSING

FIELD OF THE INVENTION

The invention relates to a device for supplying oil to a bearing in a transmission housing.

BACKGROUND OF THE INVENTION

In transmission housings oil is supplied in different ways to the bearings or gears contained therein. Already known is the method of supplying oil by spreading the oil with the rotating gears which take up the oil from the oil sump and by the rotation of the meshing gears spread the oil in the transmission housing. Collecting pockets in the inner walls of the housing can be used for collecting the oil flying around and feeding it to the places in need of oil via oil-conducting means such as bores, ducts or projecting parts. Volumes of oil formed by rotating parts as a result of the centrifugal force can be fed to areas in need of oil by tapping off pipelines to feed these areas which mesh in the rotating oil volumes. Such an arrangement was disclosed, for example, in DE 30 12 80-A1.

Oil conveyed by pumps can likewise be distributed at will to the desired places in which case expensive pipelines must be provided when a large number of bearings or gears have to be supplied with oil. Such an arrangement was disclosed, for example, in EP 0 644 359-A1. The oil is injected in the gears from a pipeline through a multiplicity of openings.

Special attention is given to the oil supply in the bearings of the main shaft in the transmission. An insufficient supply of oil in this location can result in devastating damages to the transmission and to the entire vehicle.

SUMMARY OF THE INVENTION

Wherefore, an object of this invention is to provide a device for supplying oil to the bearings situated in the transmission of the vehicle.

This and other objects are attained by the invention by providing a device according to claim 1. Embodiments are object of sub-claims.

An oil-slinger device made of light material having sufficient temperature resistance, specifically a plastic material with adequate properties, is situated next to the bearing. The oil-slinger device comprises one channel divided into three sections each of which assumes its own function. The first section of the channel is used to collect the oil scattered around and has a bulge at one end on its edge. The bulge abuts preferably on the inner walls of the transmission and can additionally collect oil falling on the inner wall. The first section of the channel converts to a second section which functions as an oil tank. The oil collected drips into the oil tank and is accumulated. The volume of said second section is such that the oil flowing or dripping in can be collected without having to be immediately dispensed. In the preferred embodiment said second section can at the same time be designed so that one of its edges has projections which can be inserted in adequately shaped intakes in the housing in order to form a positive locked arrangement between channel and housing. A third section of the channel attaches itself to the oil tank and has a reduced cross section compared to the first section and the second section. The passage between the second section and the third section is designed so that the oil level in the third section must be lower than the oil level in the second section and thus, aided by the force of gravity, oil finds the way from the second section into the third section. This occurs even when there is little oil in the second section. The third section preferably has in the course of the channel a direction different from the first section. This ensures that the end of the third section of the channel can touch behind the bearing cup of the bearing to be supplied with oil while the first section of the channel extends substantially parallel to the shaft supported on the inner wall of the housing. From the end of the third section the oil reaches directly the places of the bearing to be lubricated. At this location, the end of the channel is situated between the bearing cup and the housing within the intake for the bearing cup. Thereby a cavity is formed in the intake for the bearing, being provided in said cavity is at least part of the third section of the channel. The oil-slinger device is designed so that the bearing to be supplied with oil is fast with said positive locked arrangement thereby securing the device. Because the device is secured without additional materials and an additional screw thread for securing the device is not required on the inner wall of the housing, the assembly is simplified and the cost is reduced. Using screw threads in the correspondingly thin walls of the housing increase cost because the screw thread bores have to be sealed. Because the device is light weight and does not add much weight to the housing, the oscillations within the housing remain slight so that added fasteners are not needed. Also unnecessary is a separate intake for the oil-slinger device such as a bearing lid.

The three sections of the channel are disposed in respect to each other and the channel is situated within the housing in such a manner that from the beginning of the first section to the end of the third section of the channel there is an inclination that forces the trapped oil substantially by the force of gravity to the bearing to be oiled, eliminating the need for additional conveyance devices such as pumps.

Baffles in the form of ribs, for example, can be used within the housing to aid in the collection of oil so that the oil drips on them and at the same time drips into the channel.

The oil-slinger device offers easy assemblage combined with increased security in the lubrication of important parts of the bearing. At the same time the device is light weight and easy to produce. It is preferably made from a specially injected heat-resistant plastic material. Other methods of construction are also acceptable such as the production from a light metal such as sheet metal. The design of the oil-slinger device from a plastic material is produced between only two tool parts and is possible using a simple procedure. The two tool parts are joined and the plastic is then pressed or injected under pressure into the cavity between the two parts. The whole oil-slinger device can thus be produced in a single process with only two tool parts.

A solid fixing of the device at a minimal assembly cost is achieved by sliding the oil-slinger device into an intake in the transmission housing and situating the oil-emitting end of said device directly on the place to be oiled between bearing and housing.

The oil-slinger device obviously is not limited to the bearing described here in detail. Other bearings in the housing of a transmission or in other housings in which oil is injected can also be provided with the device according to the invention.

BRIEF DESCRIPTION OF THE DRAWING(S)

The invention is described in more detail with the aid of figures. They show:

FIG. 1 a diagrammatic representation of a vehicle;

FIG. 2 an enlarged representation of the transmission according to FIG. 1;

FIG. 3 the oil-slinger device in topview;

FIG. 4 the oil-slinger device in sideview; and

FIG. 5 the oil-slinger device in another sideview.

DESCRIPTION OF THE PREFERRED EMBODIMENT(S)

Figure 1:
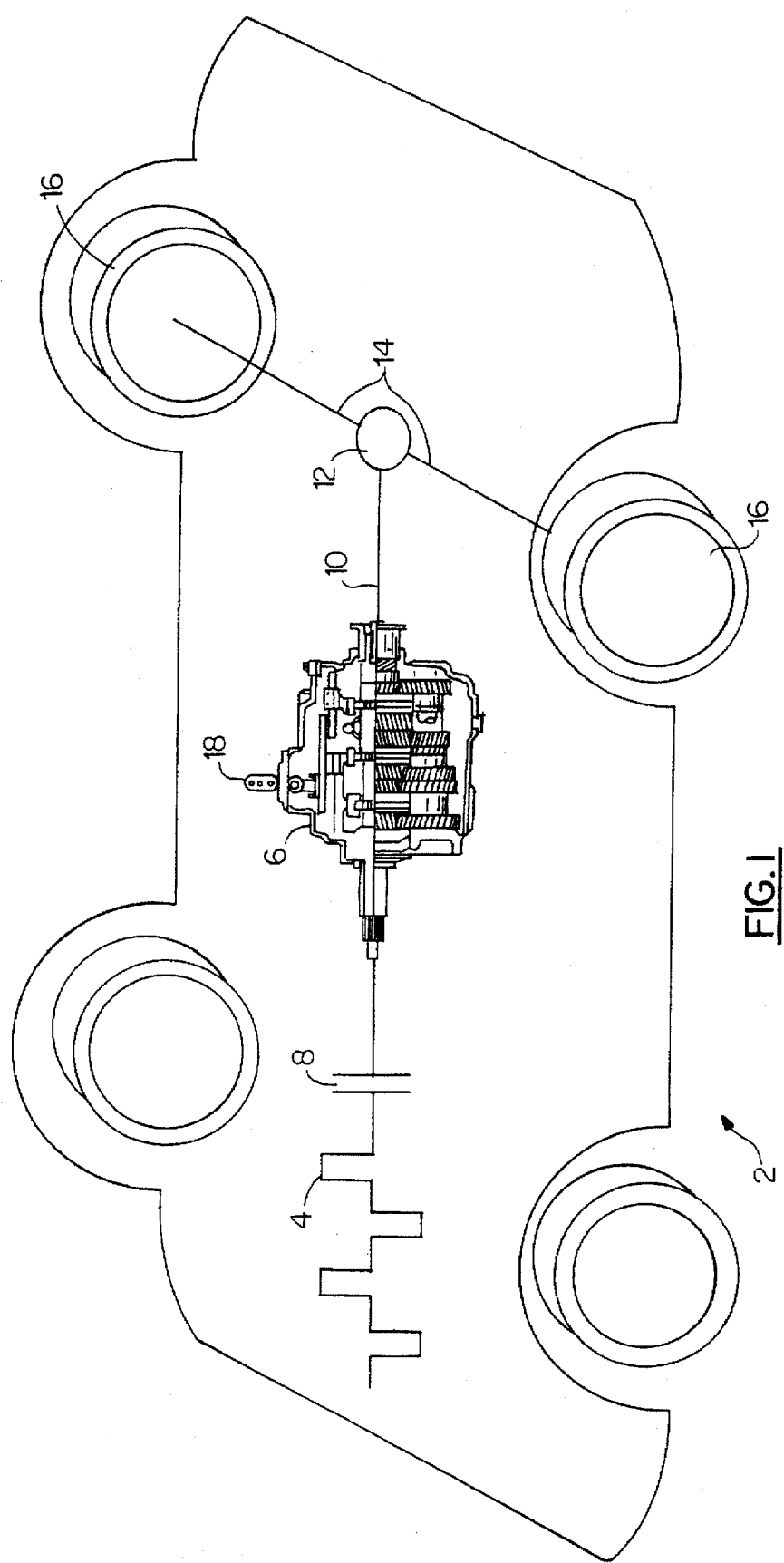

FIG. 1 shows a diagrammatic representation of a vehicle 2 with a transmission unit 4, a transmission 6 and a clutch 8 provided between the transmission unit 4 and the transmission 6. The transmission 6 is connected by an output shaft 10 with a differential 12 from which a half shaft 14 leads to each one of the driven wheels 16.

Figure 2:
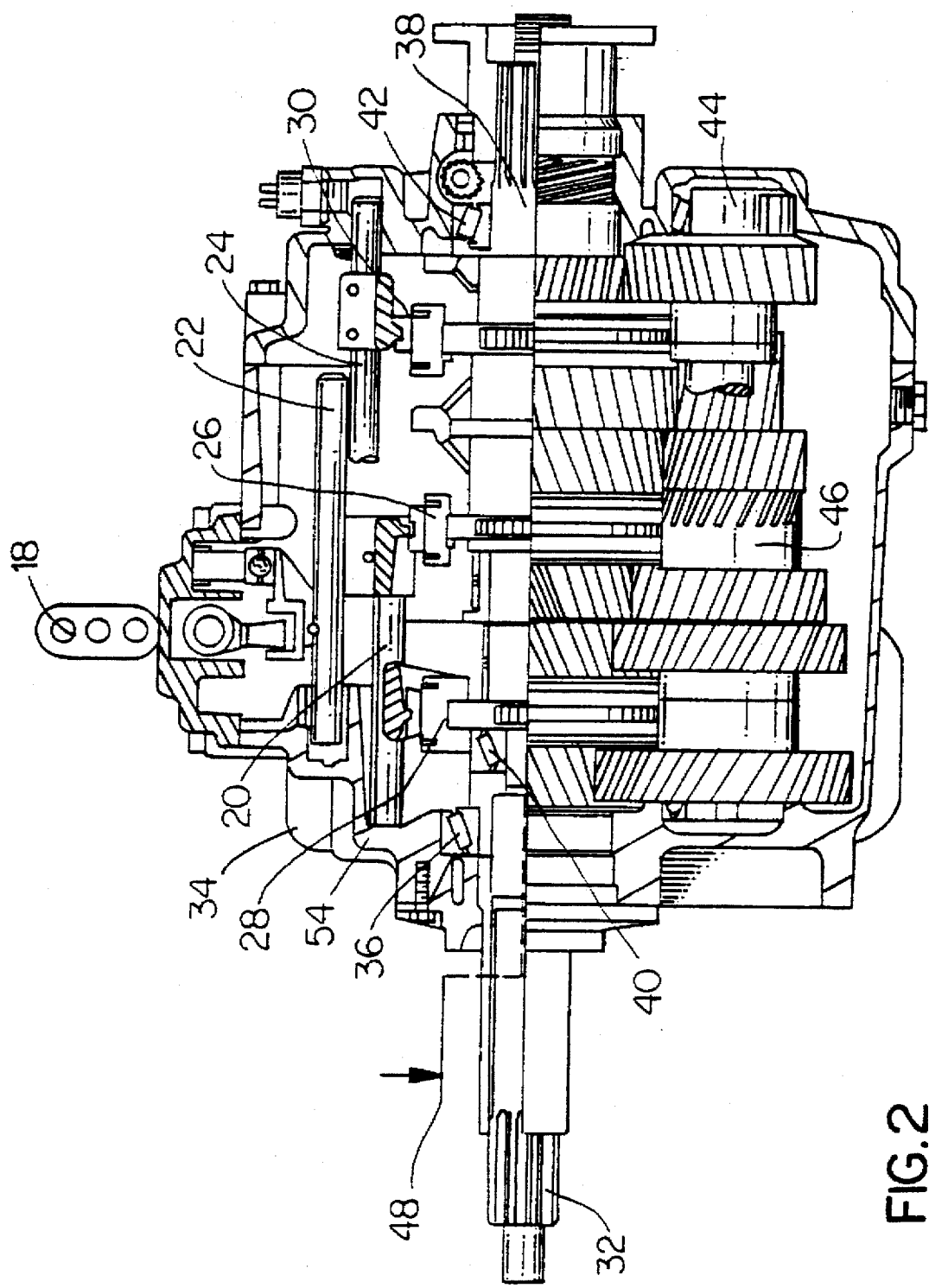
Figure 3:
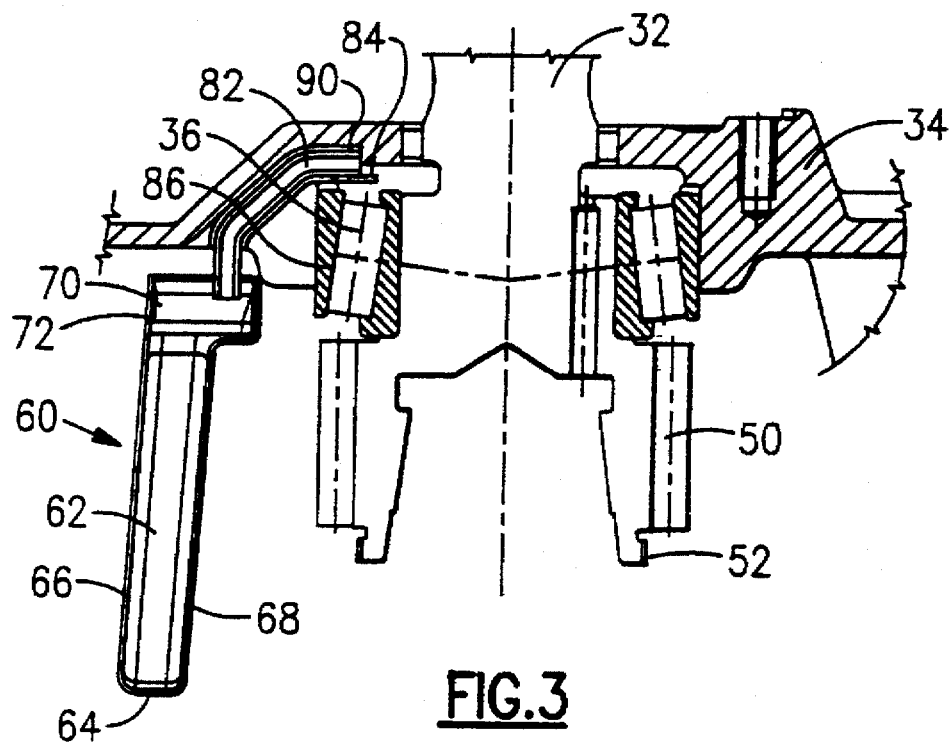

FIG. 2 shows in enlarged representation of a transmission 6 having here, for example, five forward gears and one reverse gear. Grasped with a gearshift lever 18 are the three gearshift bars 20, 22 and 24 which via gearshift forks move the synchronizer mechanisms 26, 28 and 30 to the desired gearshift positions. The synchronizer unit 30 thus engages the reverse gear and the first transmission ratio. The synchronizer unit 26 engages the gear ratios two and three while the synchronizer unit 28 is used to engage the gear ratios four and five. The transmission input shaft 32 rests in the transmission housing 34 on a support such as a bearing 36 shown here. The main shaft 38 is supported by a bearing 40 on the transmission input shaft 32 and by a support such as a bearing 42 shown here in the housing 34. The reversal of the direction of rotation of the output shaft 10 for the reverse gear is obtained by an intermediate gear 44 the teeth of which mesh in the teeth of the reverse gear on the main shaft 38 and the teeth of the countershaft 46. The other teeth on the gears on the main shaft 38 for the forward gear ratio also mesh with corresponding teeth in the counter-shaft 46. The bearing 36 of the transmission 6 is shown in FIG. 3 according to the cutting line 48. In the transmission housing 34 the transmission input shaft 32 is supported by the tapered roller bearing 36. The transmission input shaft 32 contains the teeth 50 for the fifth gear. In addition, teeth 52 are provided in the transmission input shaft 32 for lodging a clutch body 54. On the inner wall of the housing 34 is situated a channel 60. The channel 60 breaks down into three sections. A first section 62 of the channel 60 serves to collect the oil scattered about and has bulges 66 and 68 on its end 62 and on its edges. The first section 62 passes over to a second section 70 which functions as an oil tank. The oil absorbed drips in there and is collected. For this purpose the volume of said second section 70 is designed so that the oil flowing or dripping in can be collected without having to be immediately dispersed. Said second section 70 has at the same time projections 72 which can be inserted in adequately shaped recess(receiver) 74 in the housing 34 in order to form a positive locking connection between channel 60 and housing 34 (see FIG. 4). A third section 80 of the channel 60 attaches itself to the section 70 serving as oil tank and has a reduced cross section compared to the first section 62 and the second section 70. The passage between the second section 70 and the third section 80 is designed so that the oil level in the third section 80 with regard to the arrangement of the channel 60 in the transmission housing 34 is lower than the oil level in the second section 70 so that aided by the force of gravity the oil finds the way from the second section 70 to the third section 80 even when there is little oil in the second section 70. The third section 80 preferably has in the course of the channel 60 a direction different from the first section 62. The channel 60 is here preferably adapted to the inner wall of the housing 34 and the last part 82 of the third section 80 bends so that said last part 82 is at a right angle with the transmission input shaft 32. This ensures that the end 84 of the part 82 of the channel 60 is able to touch behind the bearing cup 86 of the bearing 36 to be supplied, while the first section 62 of the channel 60 extends substantially parallel to the transmission input shaft 32. In the first section 62 the channel 60 is preferably wider than the third section 80 in order to ensure an optimal collecting property design under the present conditions of the channel 60 in the first section 62. In addition, the second section 70 of the channel 60 is preferably lower than the other two sections.

Figure 4:
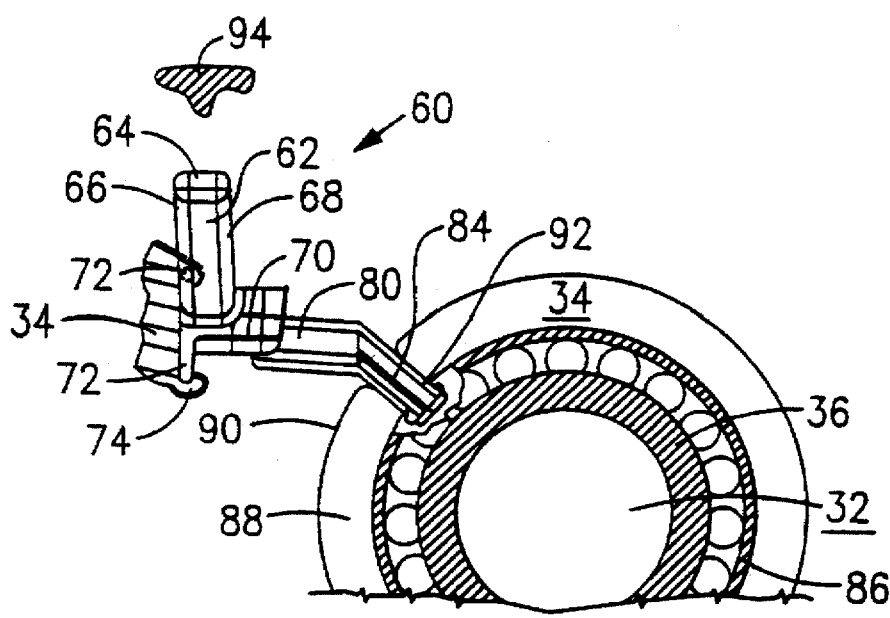

FIG. 4 shows a representation of the arrangement of the channel 60 in the transmission housing 34 viewed from the interior of the transmission 6 to the outside. The channel 60 has sections 62, 70 and 80. The first section 62 is limited by the upper end 64 and the bulges 66 and 68. The second section 70 is situated between the first section 62 and the third section 80. The second section 70 has projections 72 lodged in recesses 74 in the transmission housing 34. The whole channel 60 thus receives a firm hold in the transmission housing 34. From the end 84 of the part 82, the oil reaches the places in the bearing 36 needing lubrication. The end 84 between the bearing cup 86 and the housing 34 is situated within the intake 88 for the bearing cup 86. A cavity 90 is furnished in the intake 88 for reaching the bearing 36, at least part of the third section 80 of the channel 60 is inserted into the cavity 90. At the end 84 projections 92 can be provided which can improve the support of the third section 80 of the channel 60 in the intake 88. Depending on the interior shape of the transmission housing 34, a rib 94 can be provided from which the oil scattered about in the transmission 6 can drip into the channel 60.

Figure 5:
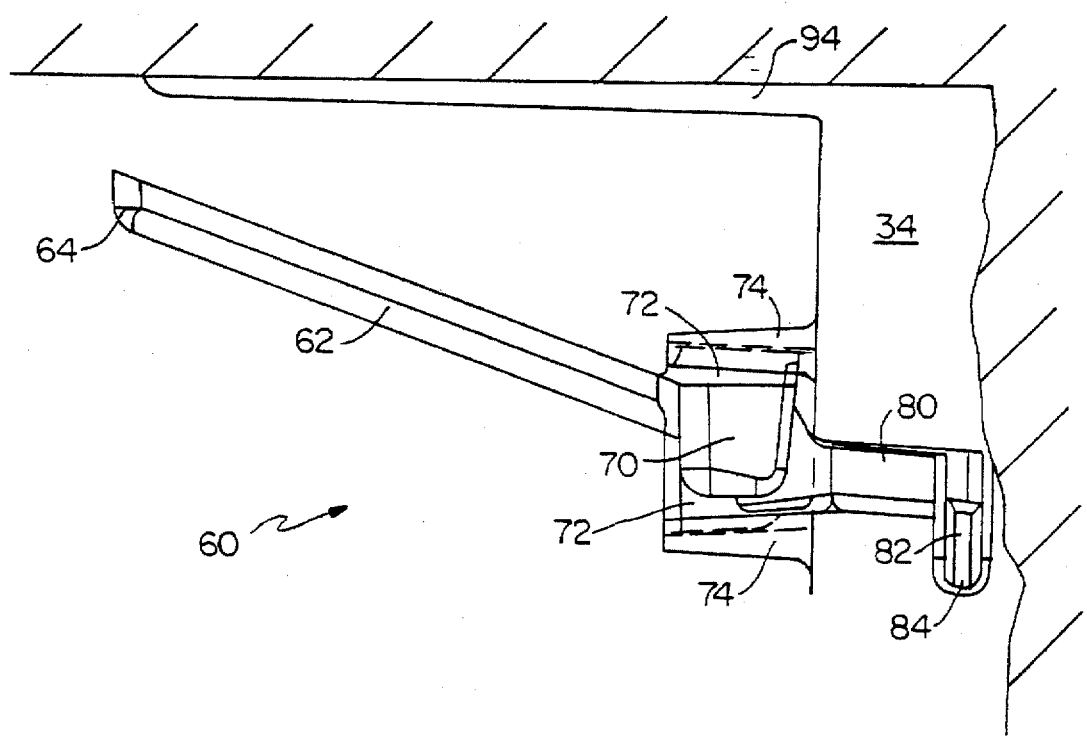

FIG. 5 shows a representation of the channel 60 in another sideview. The projections 72 connect the second section 70 of the channel 60 with the transmission housing 34. According to the invention the projections 72 mesh with intakes 74 with the transmission housing 34. From the end 84 of the third section 80 of the channel 60 the oil reaches the bearing not shown here. To improve the possibilities of collection, the oil scattered around in the transmission 6 can drip from a provided rib 94 into the channel 60.

| | Reference numerals |
|---|---|
| 2 | vehicle |
| 4 | transmission unit |
| 6 | transmission |
| 8 | clutch |
| 10 | input shaft |
| 12 | differential |
| 14 | half shaft |
| 16 | gear |
| 18 | gearshift level |
| 20–24 | gearshift bar |
| 26–30 | synchronizer mechanism |
| 32 | transmission input shaft |
| 34 | transmission housing |
| 36 | bearing |
| 38 | main shaft |
| 40 | bearing |
| 42 | bearing |
| 44 | intermediate gear |
| 46 | countershaft |
| 48 | cutting line |

-continued

| Reference numerals | |
|---|---|
| 50 | toothing |
| 52 | toothing |
| 54 | clutch body |
| 60 | channel |
| 62 | section of channel 60 |
| 64 | end of the section 62 |
| 66, 68 | bulge |
| 70 | section of channel 60 |
| 72 | projection |
| 74 | recess (receiver) |
| 80 | section of channel 60 |
| 82 | part |
| 84 | end of part 82 |
| 86 | bearing cup |
| 88 | intake |
| 90 | cavity |
| 92 | projection |
| 94 | rib |

What is claimed is:

1. An oil-slinger device (60) for a bearing (36) on a shaft (32) located within a transmission housing (34) of a vehicle (2), and said transmission housing (34) comprising a side wall and accommodating therein a plurality of gears and at least an input shaft and an output shaft;

wherein said oil-slinger device (60) has a first end (84) and a second end and an intermediate section located therebetween, at least one projection (72) is provided on said oil-slinger device (60), said at least one projection (72) engages with at least one mating receiver (74) provide in said side wall of said transmission housing (34) to form a positive locking connection therebetween, said first end (84) of said oil-slinger device (60) is located between said bearing (36) to be supplied with oil and said side wall of said transmission housing (34) so as to prevent displacement of said oil-slinger device (60) relative to said transmission housing (34) and thereby maintain the positive locking connection between said at least one projection (72) and said at least one receiver (74).

2. The oil-slinger device (60) according to claim 1, wherein said oil-slinger device (60) comprises a channel which has three sections (62, 70, 80) with a first channel section (62) facilitating collection of the oil, a second channel section (70) facilitating storage of the oil and a third channel section (80) facilitating conveyance of the oil to the bearing (36) to be lubricated.

3. The oil-slinger device (60) according to claim 1, wherein at least one rib (94) is situated within said housing (34) adjacent said oil-slinger device (60), and said first channel section (62) of said oil-slinger device (60) is located to receive the oil which drips, during use, from said at least one rib (94).

4. The oil-slinger device (60) according to claim 1, wherein said oil-slinger device (60) is manufactured from a heat-resistant plastic material.

5. The oil-slinger device (60) according to claim 1, wherein said oil-slinger device has a channel which progressively narrows from said second end toward said first end (84).

6. The oil-slinger device (60) according to claim 1, wherein a third section of said oil-slinger device is bent to facilitate locating said first end (84) of said oil-slinger device adjacent a bearing cup of said bearing to be lubricated, while a first section of said oil-slinger device extends substantially parallel to said input shaft.

7. The oil-slinger device (60) according to claim 1, wherein said intermediate section of said oil-slinger device carries said at least one projection (72).

8. The oil-slinger device (60) according to claim 1, wherein said first end of said oil-slinger device exhausts oil directly adjacent the bearing (36) to be lubricated.

9. The oil-slinger device (60) according to claim 1, wherein said first end (84) of said oil-slinger device is provided with a projection (92) to retain said first end (84) adjacent the bearing (36) to be lubricated.

10. The oil-slinger device (60) for a bearing (36) on a shaft (32) located within a transmission housing (34) of a vehicle (2), and said transmission housing (34) comprising a side wall and accommodating therein a plurality of gears and at least an input shaft and an output shaft;

wherein said oil-slinger device (60) has a first end (84) and a second end, at least one projection (72) is provided on said oil-slinger device (60), said at least one projection (72) engages with at least one receiver (74) provide in said side wall of said transmission housing (34) to form a positive locking connection therebetween, said first end (84) of said oil-slinger device (60) is located between said bearing (36) to be supplied with oil and said side wall of said transmission housing (34) to prevent an axial displacement of said oil-slinger device (60) and thereby maintain the positive locking connection between said at least one projection (72) and said at least one receiver (74); and said transmission housing (34) further comprises a cavity (90), and said first end (84) of said oil-slinger device (60) is located in said cavity.

11. A process for using an oil-slinger device (60) comprising the steps:

locating an oil-slinger device (60) within a transmission housing (34) of a vehicle (2) and adjacent a bearing (36) of a shaft (32), said transmission housing (34) comprising a side wall and accommodating therein a plurality of gears and at least an input shaft and an output shaft;

providing said oil-slinger device (60) with a first end (84) and a second end;

engaging at least one projection (72) on said oil-slinger device (60) with at least one receiver (74) provided in said side wall of said transmission housing (34) to form a positive locking connection therebetween; and situating said first end (84) of said oil-slinger device (60) between said bearing (36) to be supplied with oil and said side wall of said transmission housing (34) so as to prevent displacement of said oil-slinger device (60) relative to said transmission housing (34) and thereby maintain the positive locking connection between said at least one projection (72) and said at least one receiver (74).

* * * * *